(12) United States Patent
Mukai

(10) Patent No.: US 7,767,322 B2
(45) Date of Patent: *Aug. 3, 2010

(54) PERPENDICULAR MAGNETIC RECORDING MEDIUM, METHOD OF PRODUCING THE SAME, AND MAGNETIC STORAGE DEVICE

(75) Inventor: Ryoichi Mukai, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 1045 days.

This patent is subject to a terminal disclaimer.

(21) Appl. No.: 11/114,894

(22) Filed: Apr. 26, 2005

(65) Prior Publication Data

US 2005/0255337 A1 Nov. 17, 2005

Related U.S. Application Data

(63) Continuation-in-part of application No. 10/940,186, filed on Sep. 14, 2004, now abandoned.

(30) Foreign Application Priority Data

| May 13, 2004 | (JP) | ............................. 2004-144011 |
| Mar. 7, 2005 | (JP) | ............................. 2005-062662 |

(51) Int. Cl.
   *G11B 5/66* (2006.01)
(52) U.S. Cl. .................................................. 428/831.2
(58) Field of Classification Search ........................ None
   See application file for complete search history.

(56) References Cited

U.S. PATENT DOCUMENTS 5,543,221 A    8/1996    Kitakami et al.
6,858,319 B2   2/2005    Yasui et al.
7,175,925 B2 * 2/2007    Chen et al. ................... 428/831
7,368,185 B2 * 5/2008    Hirayama et al. ......... 428/831.2
2004/0000374 A1 1/2004   Watanabe et al.
2005/0031905 A1 2/2005   Yasui et al.
2007/0065955 A1 * 3/2007 Maeda et al. .................. 438/3

FOREIGN PATENT DOCUMENTS

| JP | 2524514      | 5/1996  |
| JP | 2002-175621  | 6/2002  |
| JP | 2003-115106  | 4/2003  |
| JP | 2003-217107  | 7/2003  |
| JP | 2003-317221  | 11/2003 |
| JP | 2003-346334  | 12/2003 |
| JP | 2004-022082  | 1/2004  |
| JP | 2004-022138  | 1/2004  |
| JP | 2004-134041  | 4/2004  |

* cited by examiner

*Primary Examiner*—Holly Rickman
(74) *Attorney, Agent, or Firm*—Greer, Burns & Crain, Ltd.

(57) ABSTRACT

A perpendicular magnetic recording medium is disclosed that includes a recording layer having a columnar granular structure possessing an appropriate diameter distribution and uniform arrangement of magnetic particles. The perpendicular magnetic recording medium includes a substrate, and a soft-magnetic underlayer, a seed layer, an underlayer, a recording layer, a protection film, and a lubrication layer stacked on the substrate in order. The underlayer includes granular crystals formed from Ru or a Ru alloy and interstices separating the granular crystals from each other so as to isolate individual granular crystals. A continuing film formed from Ru or Ru alloys may be provided below the underlayer.

13 Claims, 12 Drawing Sheets

|  | O | Si | Cr | Co | Pt |
|---|---|---|---|---|---|
| POINT A | 7.4 | 5.7 | 5.2 | 64.3 | 17.4 |
| POINT B | 39.6 | 45.1 | 2.8 | 10.6 | 2.0 |

(UNIT: ATOMS %)

PERPENDICULAR MAGNETIC RECORDING MEDIUM, METHOD OF PRODUCING THE SAME, AND MAGNETIC STORAGE DEVICE

CROSS-REFERENCE TO RELATED APPLICATION

The present application is a continuation-in-part application of the U.S. patent application Ser. No. 10/940,186 filed on Sep. 14, 2004, now abandoned based on Japanese Priority Patent Applications No. 2004-144011 filed on May 13, 2004 and No. 2005-062662 filed on Mar. 7, 2005. The entire contents of these applications are hereby incorporated by reference.

BACKGROUND OF THE INVENTION

1. Field of the Invention

The present invention relates to a perpendicular magnetic recording medium, a method of producing the medium, and a magnetic storage device, and particularly, to a perpendicular magnetic recording medium including a magnetic layer in which magnetic particles are isolated by a non-magnetic material.

2. Description of the Related Art

Recently and continuing, magnetic storage devices, for example, hard disk drives, are widely used in computers because they have low prices per bit, and store digital signals, thus enabling an increase of their capacities. Along with rapidly increasing demand on the magnetic storage devices, especially due to applications of the magnetic storage devices to digital audio/image related appliances, it is required to further increase the capacity of the magnetic storage devices to store the video signals.

In order to achieve both a high capacity and a low price, attempts can be made to increase the recording density of a magnetic storage medium in the magnetic storage device, thereby making it possible to reduce the number of the magnetic storage media in the magnetic storage device. Moreover, by increasing the recording density, it is possible to reduce the number of magnetic heads and other parts, thereby reducing the price of the magnetic storage device.

The recording density of the magnetic storage medium can be increased by improving the signal-to-noise ratio (S/N) through increasing the recording resolution and reducing noise. In the related art, effects have been made at miniaturization of magnetic particles constituting a recording layer of the magnetic storage medium and magnetic isolation of the magnetic particles in order to reduce noise.

In a perpendicular magnetic recording medium, an underlayer formed from a soft magnetic material is applied on a substrate, and on the underlayer a recording layer is stacked, forming the perpendicular magnetic recording medium.

The recording layer is usually formed from a CoCr-based alloy, and is applied on the substrate by sputtering the CoCr-based alloy onto the substrate while continuously heating the substrate. In the CoCr-based alloy recording layer, there appear Co-enriched CoCr-based alloy magnetic particles, and non-magnetic Cr forming boundaries around the magnetic particles, whereby, adjacent magnetic particles are isolated.

On the other hand, when reproducing data from the perpendicular magnetic recording medium, the soft magnetic underlayer forms a magnetic circuit for magnetic flux to flow into a magnetic head. If the soft magnetic material is a crystal, magnetic domains are formed in the soft magnetic material, and spike noises are generated.

To reduce the noise, usually the soft magnetic underlayer is formed from materials in which it is difficult for magnetic domains to be formed, for example, amorphous materials or micro-granular crystals. Further, in order to avoid crystallization of the soft magnetic underlayer, the heating temperature is limited when forming the recording layer.

Therefore, in order to achieve isolation of the magnetic particles, it has been studied to use a recording layer which does not require high temperature heating. For example, in the recording layer, CoCr-based alloy magnetic particles are isolated by $SiO_2$ non-magnetic parent phases. Furthermore, it is proposed that a Ru film be formed under the recording layer (below, referred to as an underlayer) so that the magnetic particles essentially grow at equal intervals. For example, Japanese Laid-Open Patent Application No. 2003-217107 and Japanese Laid-Open Patent Application No. 2003-346334 disclose inventions related to this technique.

However, if merely forming the Ru layer under the recording layer, crystals of the magnetic particles grow on the surface of the granular crystals of the Ru film, and depending on the sizes and arrangement of the granular crystals, the magnetic particles may combine with each other; as a result, sufficient isolation between the magnetic particles cannot be achieved, the distribution of diameters of the magnetic particles becomes more spread, and consequently, noise generated in the medium increases.

On the other hand, if adjacent magnetic particles are formed at regular intervals, it is necessary to form a seed layer below the Ru film to control growth of the granular crystals of the Ru film. In this case, a stacked structure of a plurality of seed layers is required, and this makes the seed layer thick. As a result, the distance between the soft magnetic underlayer and the recording layer is large, and this increases the magnetic field of the magnetic head required for recording. Further, because the distribution of the magnetic field of the magnetic head becomes more spread, data on neighboring tracks may be erased accidentally.

SUMMARY OF THE INVENTION

It is a general object of the present invention to solve one or more of the problems of the related art.

It is a more specific object of the present invention to provide a perpendicular magnetic recording medium that includes a recording layer having a columnar granular structure possessing an appropriate diameter distribution and uniform arrangement of magnetic particles, a method of producing the perpendicular magnetic recording medium, and a magnetic storage device.

According to a first aspect of the present invention, there is provided a perpendicular magnetic recording medium that includes a substrate; a soft-magnetic underlayer on the substrate; a seed layer formed from an amorphous material on the soft-magnetic underlayer; an underlayer formed from Ru or a Ru alloy on the seed layer; and a recording layer on the underlayer.

The underlayer includes a plurality of granular crystals each growing in a direction perpendicular to a surface of the substrate, and a plurality of interstices separating the granular crystals from each other.

The recording layer includes a plurality of magnetic particles each having an easy axis of magnetization substantially perpendicular to the surface of the substrate, and a plurality of non-magnetic immiscible phases separating the magnetic particles from each other.

According to the present invention, the granular crystals in the underlayer grow while being separated from each other by the interstices. Accordingly, the magnetic particles in the recording layer on the underlayer are also separated from each other. As a result, the distribution of diameters of the magnetic particles is improved, magnetic interaction between the magnetic particles is reduced or made uniform, noise in the perpendicular magnetic recording medium is reduced, and this increases the recording density.

As an embodiment, the interstices are formed from a bottom of the underlayer to an interface between the underlayer and the recording layer.

As an embodiment, intervals between the granular crystals in the underlayer are in a range from 1 nm to 2 nm.

As an embodiment, the average diameter of the granular crystals in the underlayer is in a range from 2 nm to 10 nm.

As an embodiment, the thickness of the underlayer is in a range from 2 nm to 16 nm.

As an embodiment, the perpendicular magnetic recording medium further includes a second underlayer between the seed layer and the underlayer. The second underlayer includes a plurality of second granular crystals formed from Ru or a Ru alloy and a plurality of polycrystalline films, each of said polycrystalline films being formed by said second granular crystals coupled with each other through granular boundaries.

According to the present invention, because the second underlayer including granular crystals and polycrystalline films is provided between the seed layer and the underlayer, the crystal orientation of the granular crystals in the underlayer is improved, and the crystal orientation of the magnetic particles in the recording layer is further improved. As a result, it is possible to reduce the total thickness of the two underlayers, and arrange the soft-magnetic underlayer to be close to the recording layer. Consequently, it is possible to reduce the magnetic field of the magnetic head for recording, and reduce leakage of the magnetic field when recording.

As an embodiment, the Ru alloy has a hcp crystalline structure, and is a Ru—X alloy with Ru as a major component, where X represents at least one of Co, Cr, Fe, Ni, and Mn.

As an embodiment, the perpendicular magnetic recording medium further has a grain embryo layer including a plurality of isolate grain embryos on a surface of the seed layer. The second underlayer is formed so that the second granular crystals cover the grain embryos. In the embodiment, the grain embryo layer is formed from a material including at least one of Pt, W, Ag, Au, and alloys of Pt, W, Ag, Au. Alternatively, the grain embryo layer is formed from a material including at least one of Ru, a Ru alloy, Ti, Ta, Co, and CoPt. The Ru alloy may be a Ru—X alloy, where X represents at least one of Co, Cr, Fe, Ni, and Mn.

Furthermore, an equivalent thickness of the grain embryo layer is set to be in a range from 0.2 nm to 1.0 nm, determined by assuming that the grain embryo layer is a continuous film having the same volume as an aggregation of the grain embryos.

According to the above invention, because isolate grain embryos are distributed on the surface of the seed layer, the second granular crystals of the second underlayer grow to cover the grain embryos. Because the second granular crystals grow from the grain embryos formed beforehand, the second granular crystals essentially start to grow at the same time. As a result, the second granular crystals have substantially the same diameter (that is the size of a cross section of a crystal grain parallel to the substrate plane). Therefore, a uniform distribution of grain diameters of the second granular crystals can be attained.

In addition, because granular crystals of the underlayer grow on the second granular crystals, further, granular crystals of the recording layer grow on the granular crystals of the underlayer, a uniform distribution of grain diameters of the second granular crystals is attainable.

In this way, since the perpendicular magnetic recording medium has a good diameter distribution, the medium noise can be further reduced.

As an embodiment, the seed layer is formed from a material including at least one of Ta, Ti, C, Mo, W, Re, Os, Hf, Mg, Pt, and alloys of Ta, Ti, C, Mo, W, Re, Os, Hf, Mg, and Pt, or NiP. Further, the seed layer is a single layer, and the thickness of the seed layer is from 1 nm to 10 nm.

As an embodiment, the magnetic particles in the recording layer are formed from one of Ni, Fe, Co, Ni-based alloys, Fe-based alloys, Co-based alloys including CoCrTa, CoCrPt, and CoCrPt-M, where M represents a material including at least one of B, Mo, Nb, Ta, W, Cu, and alloys thereof. The immiscible phases in the recording layer are formed from a compound including at least one of Si, Al, Ta, Zr, Y, and Mg, and at least one of O, C, and N.

According to a second aspect of the present invention, there is provided a magnetic storage device that includes a recording and reproduction unit including a magnetic head; and a perpendicular magnetic recording medium.

The perpendicular magnetic recording medium includes a substrate; a soft-magnetic underlayer on the substrate; a seed layer formed from an amorphous material on the soft-magnetic underlayer; an underlayer formed from Ru or a Ru alloy on the seed layer; and a recording layer on the underlayer.

The underlayer includes a plurality of granular crystals each growing in a direction perpendicular to a surface of the substrate, and a plurality of interstices separating the granular crystals from each other.

The recording layer includes a plurality of magnetic particles each having an easy axis of magnetization substantially perpendicular to the surface of the substrate, and a plurality of non-magnetic immiscible phases separating the magnetic particles from each other.

According to the present invention, it is possible to reduce noise in the perpendicular magnetic recording medium in the magnetic storage device, and because the soft-magnetic underlayer and the recording layer can be arranged close to each other, it is possible to reduce leakage of the magnetic field of the magnetic head when recording. Consequently, it is possible to increase linear recording density and track density, and realize high density recording.

According to a third aspect of the present invention, there is provided a method of producing a perpendicular magnetic recording medium which includes the steps of forming a soft-magnetic underlayer on a substrate; forming a seed layer formed from an amorphous material on the soft-magnetic underlayer; forming an underlayer formed from Ru or a Ru alloy on the seed layer; and forming a recording layer on the underlayer. The recording layer includes a plurality of magnetic particles each having an easy axis of magnetization substantially perpendicular to a surface of the substrate, and a plurality of non-magnetic immiscible phases separating the magnetic particles from each other.

In the step of forming the underlayer, the underlayer is deposited on the seed layer by sputtering at a deposition speed in a range from 0.1 nm/sec to 2 nm/sec with the pressure of a gas atmosphere to be set in a range from 2.66 Pa to 26.6 Pa.

According to the present invention, by setting a deposition speed of forming the underlayer to be in a predetermined range, and setting a pressure in an atmosphere gas to be in a predetermined range, it is possible to form the underlayer in which the granular crystals are separated by the interstices. As a result, the distribution of diameters of the magnetic particles is improved, magnetic interaction between the magnetic particles is reduced or made uniform, and noise in the perpendicular magnetic recording medium is reduced. This makes it possible to increase the recording density.

As an embodiment, the method of producing the perpendicular magnetic recording medium further includes a step of forming a second underlayer after the step of forming the seed layer, and before the step of forming the underlayer. In the step of forming the second underlayer, the second underlayer is deposited by sputtering at a deposition speed in a range from 2 nm/sec to 8 nm/sec with the pressure of the gas atmosphere to be set in a range from 0.26 Pa to 2.6 Pa.

As an embodiment, in the step of forming the second underlayer, a surface of the seed layer is exposed to active gas.

As an embodiment, the method further comprises a step of forming a grain embryo layer between the step of forming the seed layer and the step of forming the second underlayer, wherein in the step of forming the second underlayer, a metal material is deposited by sputtering in a island manner with a pressure of the gas atmosphere being set in a range from 2.66 Pa to 26.6 Pa.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

First Embodiment

Figure 1:
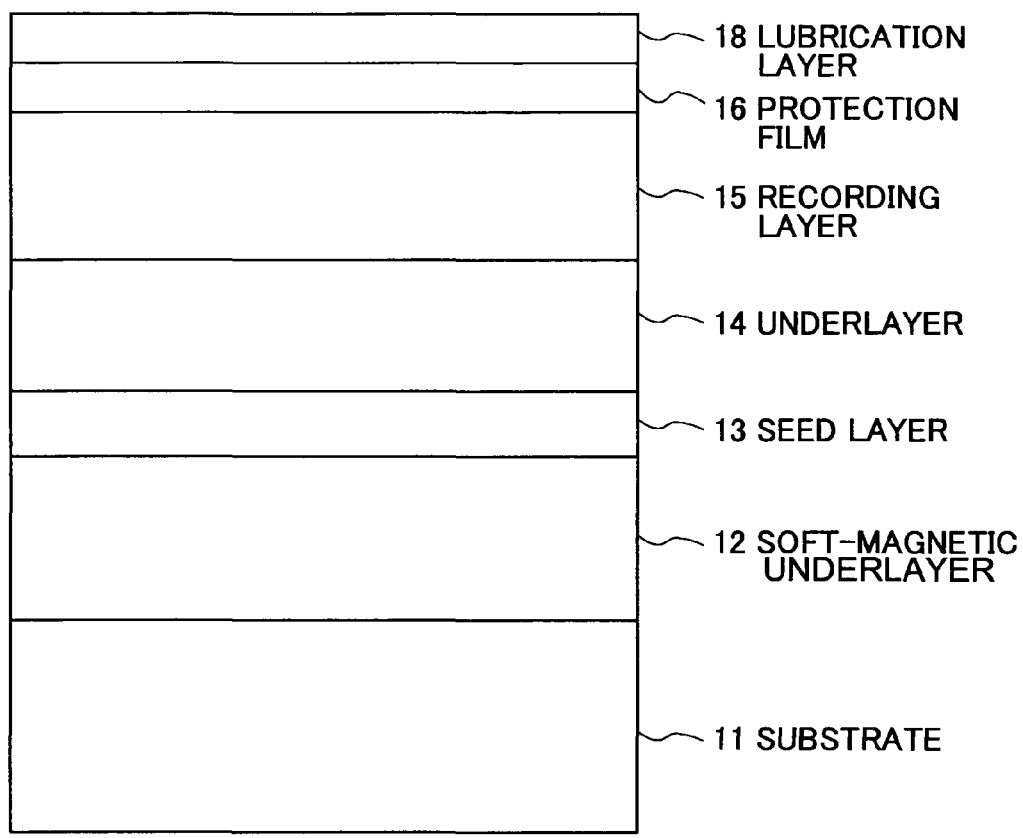
FIG. 1 is a schematic cross-sectional view of a perpendicular magnetic recording medium according to a first embodiment of the present invention.

FIG. 1 is a schematic cross-sectional view of a perpendicular magnetic recording medium according to a first embodiment of the present invention.

As illustrated in FIG. 1, the perpendicular magnetic recording medium 10 includes a substrate 11, and a soft-magnetic underlayer 12, a seed layer 13, an underlayer 14, a recording layer 15, a protection film 16, and a lubrication layer 18 stacked on the substrate 11 in order.

In the underlayer 14, as will be described below with reference to FIG. 2, granular crystals are formed to be separated from each other.

In the perpendicular magnetic recording medium 10, because magnetic particles in the recording layer 15 grow on the granular crystals in the underlayer 14, the isolation condition of the magnetic particles is improved, and as a result, noise in the perpendicular magnetic recording medium 10 is reduced, and the perpendicular magnetic recording medium 10 is capable of recording at a high density.

The substrate 11, for example, may be formed by a plastic, crystal glass, strengthened glass, Silicon, or aluminum alloys. When the perpendicular magnetic recording medium 10 is a tape, the substrate 11 may be formed by a film of PET (polyethylene terephthalate), PEN (polyethylene naphthalate), or heat-resistant polyamide. In the present embodiment, the substrate 11 can be made from these resin-based materials as it is not necessary to heat the substrate 11 in the present embodiment.

The soft-magnetic underlayer 12, for example, is 50 nm-2 μm in thickness, and is formed from an amorphous alloy or a micro-crystal alloy including at least one of Fe, Co, Ni, Al, Si, Ta, Ti, Zr, Hf, V, Nb, C, and B, or a stacked layer of alloys of these elements. From the point of view of concentrating the recording magnetic field of the magnetic head, it is preferable to use soft magnetic materials having saturation magnetic flux density of 1.0 T or more. For example, use can be made of FeSi, FeAlSi, FeTaC, CoZrNb, CoCrNb, and NiFeNb. The soft-magnetic underlayer 12 can be formed by plating, sputtering, vapor deposition, or CVD (Chemical Vapor Deposition).

Because the soft-magnetic underlayer 12 absorbs almost all of the magnetic flux from the recording head, it is preferable that the product of the saturation magnetic flux density Bs and the film thickness be large in order to conduct saturation recording. In addition, from the point of view of writing at high transmission rates, it is preferable that the soft-magnetic underlayer 12 have a large high-frequency magnetic permeability.

The seed layer 13, for example, is 1.0 nm-10 nm in thickness, and is formed from a material including at least one of Ta, Ti, C, Mo, W, Re, Os, Hf, Mg, Pt, or alloys of any of these metals, or NiP.

The seed layer 13 orients the c axis of the granular crystals of the underlayer 14 along the thickness direction, and uniformly distributes the granular crystals in the surface direction.

From the point of view of orientating the underlayer 14, it is preferable that the seed layer 13 be formed from Ta.

In order to be near the soft-magnetic underlayer 12 and the recording layer 15, it is preferable that the seed layer 13 be a single layer formed from Ta, and preferably, the thickness of the seed layer 13 is from 1 nm to 5 nm. Certainly, the seed layer 13 may be a stacked layer of Ta films.

The underlayer 14, preferably, is formed from Ru having a hcp crystalline structure, or Ru—X alloys with Ru as a major component and having the hcp crystalline structure. Here, X represents a material including at least one of Co, Cr, Fe, Ni, and Mn.

Preferably, the thickness of the underlayer 14 is in the range from 2 nm to 16 nm. If the thickness of the underlayer 14 is less than 2 nm, the crystal properties of the underlayer 14 decline, and if the thickness of the underlayer 14 is greater than 16 nm, the crystal orientation of the granular crystals is degraded, and this may result in leakage of the magnetic field of the magnetic head during recording.

From the point of view of isolation of the granular crystals, it is preferable that the thickness of the underlayer 14 be from 3 nm to 16 nm.

Furthermore, from the point of view of space loss, it is preferable that the thickness of the underlayer 14 be from 3 nm to 10 nm.

When the underlayer 14 is formed from materials having the hcp crystalline structure, such as Ru or Ru—X alloys, because magnetic particles of the recording layer 15 also have the hcp crystalline structure, the easy axes of magnetization of the magnetic particles of the recording layer 15 are oriented substantially perpendicular to the surface of the substrate 11.

From the point of view of good crystal growth, it is preferable that the underlayer 14 be formed from Ru.

Below, descriptions are made of the underlayer 14 and the recording layer 15 on the underlayer 14.

Figure 2:
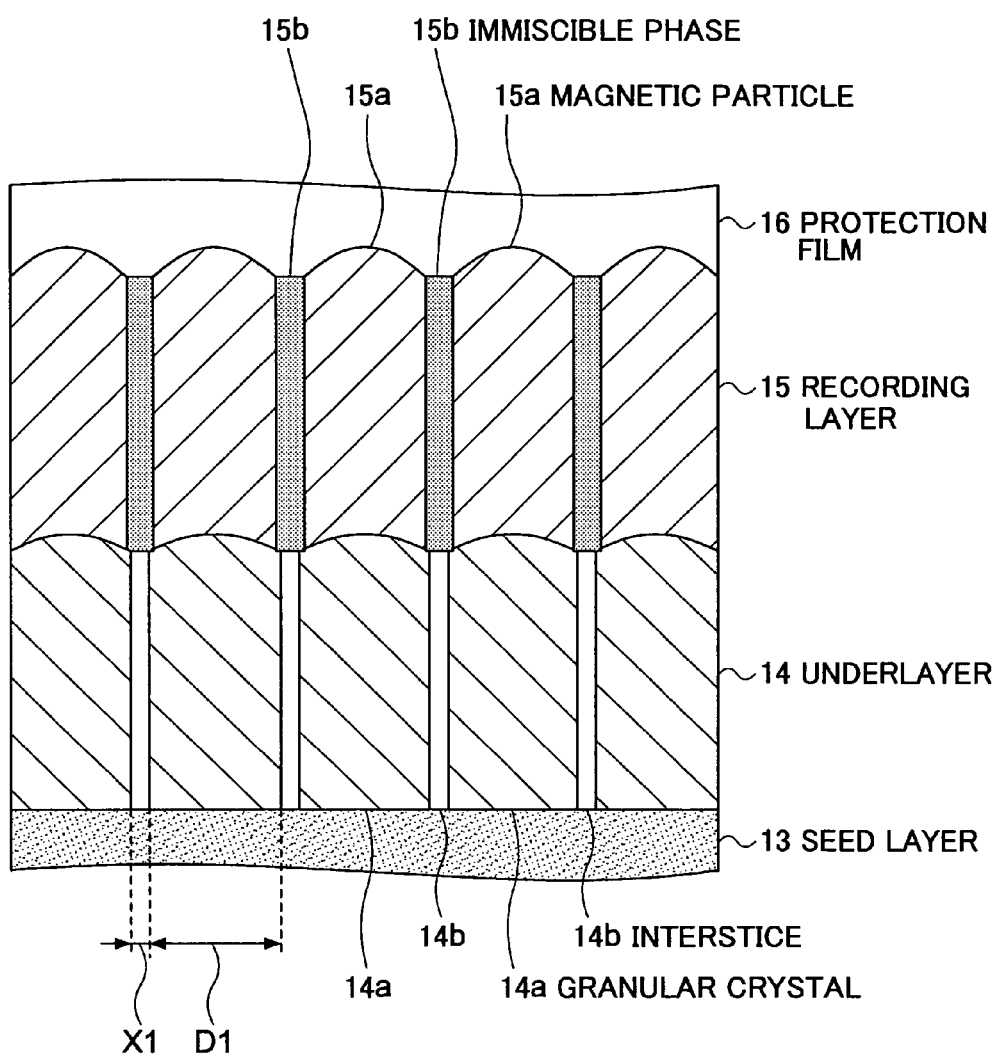
FIG. 2 is an enlarged schematic view of a portion of the perpendicular magnetic recording medium 10 according to the first embodiment of the present invention.

FIG. 2 is an enlarged schematic view of a portion of the perpendicular magnetic recording medium 10 according to the first embodiment of the present invention.

As illustrated in FIG. 2, the underlayer 14 includes granular crystals 14a and interstices 14b separating the granular crystals 14a from each other.

The granular crystals 14a are formed from a Ru crystal or Ru—X crystal alloys. The granular crystals 14a are in columnar shapes, grow on the surface of the seed layer 13 in the thickness direction of the seed layer 13, and reach the interface between the underlayer 14 and the recording layer 15. Each granular crystal 14a includes one or more single crystal zones.

As illustrated in FIG. 2, the interstices 14b are formed from the bottom of the underlayer 14 to the interface between the underlayer 14 and the recording layer 15 so as to enclose the granular crystals 14a. Alternatively, the interstices 14b may be formed to expand gradually while approaching the upper portion of the underlayer 14.

From cross-sectional views, obtained by a TEM (Transmission Electron Microscope), of the perpendicular magnetic recording medium 10 formed by the method of the present invention, it was observed by the inventor of the present invention that there are more wide interstices 14b around the upper portion of the granular crystals 14a than the lower portion of the granular crystals 14a.

By forming the underlayer 14 having the above configuration, magnetic particles 15a in the recording layer 15, which is on the surface of the granular crystals 14a of the underlayer 14, are appropriately separated from each other.

As described below, the underlayer 14 having the above configuration can be formed with the pressure in an atmosphere of an Ar gas or other inactive gas to be set in a predetermined range, and with the deposition speed of the underlayer 14 to be set in a predetermined range.

Preferably, the average diameter D1 of the granular crystals 14a in the surface direction is set to be from 2 nm to 10 nm, more preferably, from 5 nm to 10 nm. Due to this, it is easy to control diameters of the magnetic particles 15a in the recording layer 15, which grow on the granular crystals 14a of the underlayer 14.

Preferably, the average width X1 of the interstices 14b is set to be from 1 nm to 2 nm. Due to this, it is easy to control gaps between the magnetic particles 15a in the recording layer 15.

The recording layer 15, for example, is 6 nm to 20 nm in thickness, and includes a plurality of columnar magnetic particles 15a, and non-magnetic immiscible phases 15b that physically separate adjacent magnetic particles 15a from each other.

The magnetic particles columns 15a are orientated in the thickness direction of the recording layer 15, and the non-magnetic immiscible phases 15b fill in between the magnetic particles 15a in the recording layer 15.

The magnetic particles 15a may be formed from one of Ni, Fe, Co, Ni-based alloys, Fe-based alloys, Co-based alloys including CoCrTa, CoCrPt, and CoCrPt-M. Here M represents a material including at least one of B, Mo, Nb, Ta, W, Cu, and alloys of any of them.

Each of the magnetic particles 15a has an easy axis of magnetization substantially perpendicular to the surface of the recording layer 15, that is, in the thickness direction of the recording layer 15. When the ferromagnetic alloys constituting the magnetic particles 15a have the hcp crystalline structure, the (001) plane passes through the thickness direction, that is, the growing direction.

When the magnetic particles 15a are formed from CoCrPt alloys, for example, the atomic content of Co is set to be 50% through 80%, the atomic content of Cr is set to be 5% through 20%, and the atomic content of Pt is set to be 15% through 30%. Compared to perpendicular magnetic recording media in the related art, the atomic content of Pt is high. Due to this, it is possible to increase anisotropy of the magnetic field in the perpendicular direction and obtain a large coercive force.

Conventionally, it is accepted that it is difficult to achieve epitaxial growth on underlying Cr-based materials. By using the aforesaid materials for the magnetic particles 15a according to the present embodiment, it is possible to form the magnetic particles 15a having good crystal properties.

The immiscible phases 15b are formed from non-magnetic materials that are immiscible with or do not form compounds with the ferromagnetic alloys constituting the magnetic particles 15a. The immiscible phases 15b may be formed from compounds including at least one of Si, Al, Ta, Zr, Y, and Mg, and at least one of O, C, and N, for example, $SiO_2$, $Al_2O_3$, $Ta_2O_3$, $ZrO_2$, $Y_2O_3$, $TiO_2$, MgO, or other oxides, $Si_3N_4$, AlN, TaN, ZrN, TiN, $Mg_3N_2$, or other nitrides, or carbides like SiC, TaC, ZrC, TiC.

Due to the immiscible phases 15b formed from non-magnetic materials, adjacent magnetic particles 15a are physically separated, and the magnetic interaction between the magnetic particles 15a is reduced; consequently, noise in the perpendicular magnetic recording medium 10 is reduced.

Preferably, the immiscible phases 15b are formed from insulating non-magnetic materials, whereby it is possible to reduce the magnetic interaction between the magnetic particles 15a caused by the tunneling effect of electrons that generate the ferromagnetism.

Preferably, the volume concentration of the immiscible phases 15b, for example, is set in the range from 2% to 40% relative to the volume of the recording layer 15. If the concentration of the immiscible phases 15b is lower than 2%, adjacent magnetic particles 15a cannot be separated sufficiently, and the magnetic particles 15a cannot be sufficiently isolated. If the concentration of the immiscible phases 15b is higher than 40%, the saturation magnetization of the recording layer 15 decreases significantly, and the reproduction output decreases.

From the point of view of isolation of the magnetic particles 15a and perpendicular orientation distribution, it is preferable to set the volume concentration of the immiscible phases 15b to be in the range from 8% to 30% relative to the volume of the recording layer 15.

Returning to FIG. 1, the protection film 16, for example, is 0.5 nm to 15 nm in thickness, and may be formed from amorphous carbon, carbon hydride, carbon nitride, aluminum oxide, and the like.

The lubrication layer 18, for example, is 0.5 nm to 5 nm in thickness, and is formed by a lubricant having a main chain of PFPE (perfluoroalkylpolyether). The lubricant may be, for example, Zdol, Z25 (these two are products of Monte Fluos Company), or AM3001. Depending on the materials of the protection film 16, the lubrication layer 18 may be provided or be omitted.

In the perpendicular magnetic recording medium 10 of the present embodiment, the granular crystals 14a in the underlayer 14 grow while being separated from each other by the interstices 14b, and on the granular crystals 14a, the magnetic particles 15a of the recording layer 15 are formed to be separated from each other, too. Therefore, the diameters of the magnetic particles 15a are appropriately distributed, the magnetic interaction between the magnetic particles 15a is reduced or made uniform, and this reduces noise in the perpendicular magnetic recording medium 10.

Below, with reference to FIG. 1, an explanation is made of a method of fabricating the perpendicular magnetic recording medium 10 according to the present embodiment.

First, after cleaning and drying the surface of the substrate 11, the soft-magnetic underlayer 12 is deposited on the substrate 11 by electroless plating, electroplating, sputtering, or vapor deposition.

Next, the seed layer 13 is formed on the soft-magnetic underlayer 12 by sputtering a target made from a material including at least one of Ta, Ti, C, Mo, W, Re, Os, Hf, Mg, Pt, or alloys of any of these metals, or NiP.

It is preferable to use a super-high vacuum sputtering device that can be evacuated to a vacuum of $10^{-7}$ Pa.

For example, the seed layer 13 is formed in an atmosphere of an Ar gas by a DC magnetron with the pressure of the Ar gas atmosphere set to be 0.4 Pa. During this process, it is preferable not to heat the substrate 11. Without heating the substrate 11, it is possible to prevent crystallization or growth of the micro-crystals in the soft-magnetic underlayer 12. Certainly, the substrate 11 can be heated to a temperature not resulting in crystallization or growth of the micro-crystals in the soft-magnetic underlayer 12. For example, the substrate 11 can be heated to a temperature not higher than 150° C.

The seed layer 13 may be formed while cooling the substrate 11 to −100° C. or even lower provided the fabrication device does not suffer temperature limits.

The heating or cooling process of the substrate 11 is carried out in the same way when forming the seed layer 13, the underlayer 14, and the recording layer 15.

Next, the underlayer 14 is formed on the seed layer 13 by sputtering a target made from Ru or Ru—X alloys. For example, the underlayer 14 is formed in an atmosphere of an inactive gas, such as Ar gas, by using a DC magnetron.

During this process, for example, the speed of depositing the underlayer 14 on the seed layer 13 by sputtering is set to be in a range from 0.1 nm/sec to 2 nm/sec, and the pressure of the atmosphere is set to be in a range from 2.66 Pa to 26.6 Pa. By setting the deposition speed and gas pressure in this way, it is possible to form the underlayer 14 including granular crystals 14a and the interstices 14b.

If the deposition speed is lower than 0.1 nm/sec, the yield decreases greatly, and if the deposition speed is higher than 2 nm/sec, the interstices 14b cannot be formed, but instead a continuum of the granular crystals 14a and the boundaries of the granular crystals 14a is formed, as explained in the second embodiment.

If the pressure of the inactive gas atmosphere is set to be lower than 2.66 Pa, the interstices 14b cannot be formed, but a continuum of the granular crystals 14a and the boundaries of the granular crystals 14a is formed. If the pressure of the atmosphere of the inactive gas is set to be higher than 26.6 Pa, the inactive gas is absorbed into the granular crystals 14a, thereby, the crystal properties of the granular crystals 14a decline.

Similar with formation of the seed layer 13, preferably, the substrate 11 is not heated when forming the underlayer 14. The sputtering power in this case is, for example, 50 W.

Next, the recording layer 15 is formed on the underlayer 14 by sputtering a target made from the afore-mentioned materials.

For example, the sputtering target is a composite target made from both a magnetic material for the magnetic particles 15a and a non-magnetic material for the immiscible phases 15b. Specifically, the magnetic material for the magnetic particles 15a may be one of Ni, Fe, Co, Ni-based alloys, Fe-based alloys, Co-based alloys including CoCrTa, CoCrPt, and CoCrPt-M (M represents a material including at least one of B, Mo, Nb, Ta, W, Cu, and alloys of any of them), and the non-magnetic material for the immiscible phases 15b may be compounds including at least one of Si, Al, Ta, Zr, Y, and Mg, and at least one of O, C, and N, for example, $SiO_2$, $Al_2O_3$, $Ta_2O_3$, $ZrO_2$, $Y_2O_3$, $TiO_2$, MgO, or $Si_3N_4$, AlN, TaN, ZrN, TiN, $Mg_3N_2$, or SiC, TaC, ZrC, TiC.

The recording layer 15 is formed by using a DC magnetron in an atmosphere of an inactive gas, or the inactive gas added with a gas of oxygen or nitrogen. As mentioned above, these elements exist in the immiscible phases 15b. The pressure of the atmosphere is set to be in a range from 2 Pa to 8 Pa, and preferably, in a range from 2 Pa to 3.99 Pa.

Instead of the aforesaid composite sputtering target made from both of a magnetic material and a non-magnetic material, two targets may be provided separately with one target being made from a magnetic material for the magnetic particles 15a, and the other target being made from a non-magnetic material for the immiscible phases 15b.

It should be noted that from the step of forming the seed layer 12 to the step of forming the recording layer 15, it is preferable to maintain the layers on the substrate 11 in the vacuum or in the atmosphere in the state as they are formed, because this keeps the surfaces of the layers clean.

Next, the protection film 16 is formed on the recording layer 15 by sputtering, or CVD, or FCA (Filtered Cathode Arc).

Next, the lubrication layer 18 is applied on the protection film 16 by pulling, or spin coating, or liquid surface depression.

In this way, the perpendicular magnetic recording medium 10 of the present embodiment is formed.

In the method of fabricating the perpendicular magnetic recording medium 10 of the present embodiment, because the underlayer 14 is formed with the deposition speed of the underlayer 14 in a predetermined range and with the pressure in an atmosphere of an inactive gas to be set in a predetermined range, this enables easy formation of the underlayer 14 in which the granular crystals 14a are separated by the interstices 14b, and this makes it possible to achieve an appropriate arrangement of the granular crystals 14a and isolation of the granular crystals 14a.

Second Embodiment

In the perpendicular magnetic recording medium of the second embodiment, another underlayer is further provided between the seed layer and the underlayer.

Figure 3:
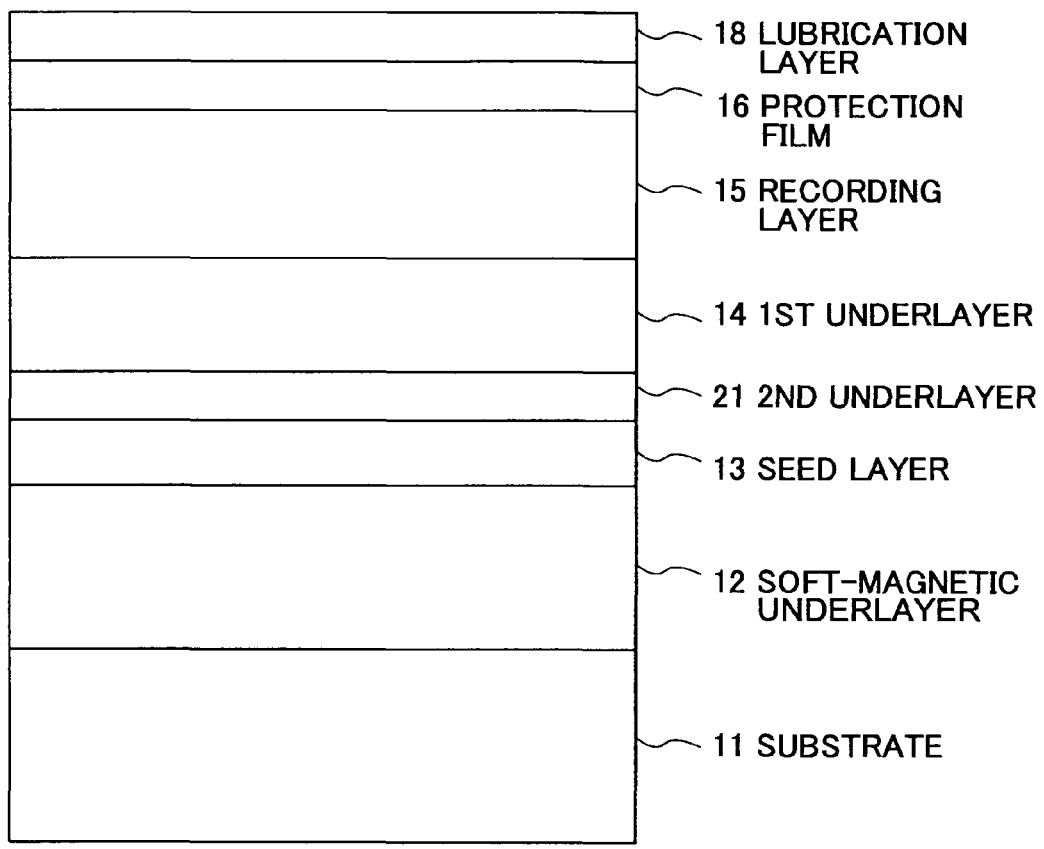
FIG. 3 is a schematic cross-sectional view of a perpendicular magnetic recording medium according to the second embodiment of the present invention.

FIG. 3 is a schematic cross-sectional view of a perpendicular magnetic recording medium 20 according to the second embodiment of the present invention.

Figure 4:
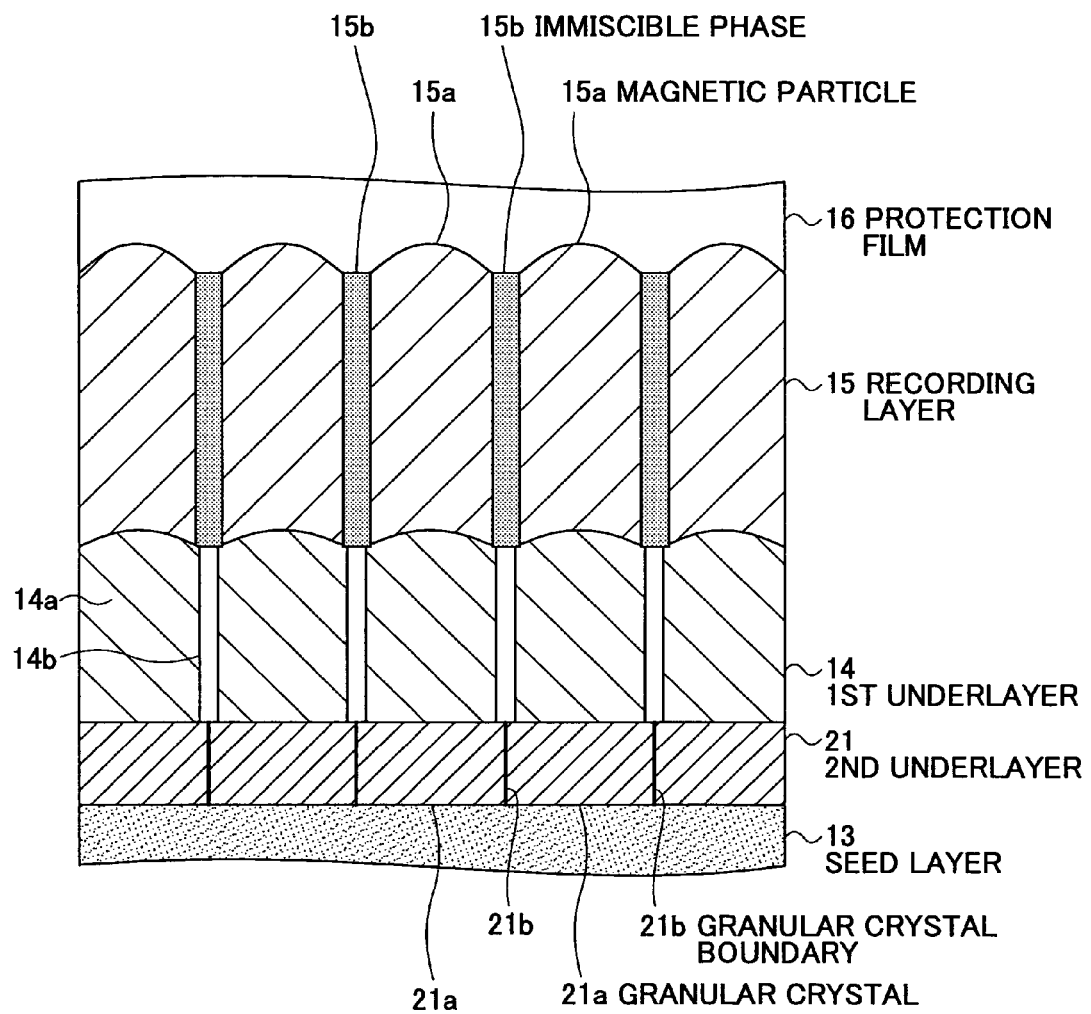
FIG. 4 is an enlarged schematic view of a portion of the perpendicular magnetic recording medium 20 according to the second embodiment of the present invention.

FIG. 4 is an enlarged schematic view of a portion of the perpendicular magnetic recording medium 20 according to the second embodiment of the present invention.

In FIG. 3 and FIG. 4, the same reference numbers are used for the same elements as those in the previous embodiment, and overlapping descriptions are omitted. Further, in FIG. 3 and FIG. 4, the underlayer 14 the same as that shown in FIG. 1 and FIG. 2 is referred to as "the first underlayer 14", and the newly provided underlayer is referred to as "the second underlayer 21".

As illustrated in FIG. 3 and FIG. 4, the perpendicular magnetic recording medium 20 includes a substrate 11, and a soft-magnetic underlayer 12, a seed layer 13, a second underlayer 21, a first underlayer 14, a recording layer 15, a protection film 16, and a lubrication layer 18 stacked on the substrate 11 in order.

In the perpendicular magnetic recording medium 20, the second underlayer 21 is provided between the seed layer 13 and the first underlayer 14. The second underlayer 21, which is formed from the same material as the first underlayer 14, is a continuing film having good crystal properties. Due to the second underlayer 21, crystal orientation of the granular crystals 14a of the first underlayer 14 is improved, and this further improves crystal orientation of the magnetic particles 15a of the recording layer 15.

The second underlayer 21 is formed from the same material as the first underlayer 14, that is, the second underlayer 21 is preferably formed from Ru having a hcp crystalline structure or a Ru—X alloy having a hcp crystalline structure and with Ru as a major component (X represents a material including at least one of Co, Cr, Fe, Ni, and Mn).

As illustrated in FIG. 4, the second underlayer 21 includes granular crystals 21a and granular crystal boundaries 21b.

The granular crystals 21a are essentially the same as the granular crystals 14a of the first underlayer 14.

The granular crystal boundaries 21b are boundaries of the granular crystals 21a, and each of the granular crystal boundaries 21b is formed from Ru atoms or atoms of the Ru—X alloys, and these atoms may be amorphous or form microcrystals.

Because the second underlayer 21 is a continuing film in which adjacent granular crystals 21a are coupled with each other through the granular crystal boundaries 21b, the second underlayer 21 has good crystal properties. The orientation of the (001) plane of the second underlayer 21 is perpendicular to the substrate. Further, the first underlayer 14 has good crystal properties near the interface with the second underlayer 21, thus crystal properties and crystal orientation of the granular crystals 14a of the first underlayer 14 are improved, and this further improves crystal properties and crystal orientation of the magnetic particles 15a of the recording layer 15.

Preferably, the thickness of the second underlayer 21 is from 2 nm to 14 nm, and the total thickness of the first underlayer 14 and the second underlayer 21 is from 4 nm to 16 nm, and from the point of view of space loss, preferably, the total thickness of the first underlayer 14 and the second underlayer 21 is from 4 nm to 11 nm.

Below, with reference to FIG. 3 and FIG. 4, an explanation is made of a method of fabricating the perpendicular magnetic recording medium 20 of the present embodiment.

The method of fabricating the perpendicular magnetic recording medium 20 of the present embodiment is basically the same as that described in the previous embodiment, except for the additional step of forming the second underlayer 21.

Below, formation of the second underlayer 21 is explained, and descriptions of other steps are omitted appropriately.

The second underlayer 21 is formed on the seed layer 13 by sputtering a target made from Ru or Ru—X alloys. For example, the second underlayer 21 is formed in an atmosphere of an inactive gas, such as Ar gas, by using a DC magnetron.

During this process, for example, the speed of depositing the second underlayer 21 on the seed layer 13 by sputtering is set to be in a range from 2 nm/sec to 8 nm/sec, or the pressure of the atmosphere of the inactive gas is set to be in the range from 0.26 Pa to 2.66 Pa, and preferably, in the range from 0.26 Pa to 1.33 Pa. By setting the deposition speed and gas pressure in this way, it is possible to form the second underlayer 21 including granular crystals 21a and a poly-crystal formed by the granular crystal boundaries 21b.

If the deposition speed is set lower than 2 nm/sec, the same interstices as the interstices 14b in the first underlayer 14 are formed because of the gas atmosphere pressure, and this results in the same film structure as that of the first underlayer 14. If the deposition speed is set higher than 8 nm/sec, it becomes difficult to control the thickness of the first underlayer 14 when forming the first underlayer 14.

If the pressure of the atmosphere of the inactive gas is set lower than 0.26 Pa, The plasma discharge in the sputtering device becomes unstable, and the crystal properties of the second underlayer 21 formed under this condition decline. If the pressure of the atmosphere of the inactive gas is set higher than 2.66 Pa, interstices the same as those in the first underlayer 14 are formed because of the deposition speed, and this results in the same film structure as that of the first underlayer 14.

For the same reasons, preferably, the substrate 11 is not heated when forming the second underlayer 21. The sputtering power in this case is, for example, 300 W.

When forming the second underlayer 21, dilute active gas may be supplied into the sputtering device so that molecules of the active gas are absorbed on the surface of the seed layer 13. The active gas may be oxygen gas, or $N_2O$ gas. The amount of the absorbed molecules is controlled to be an appropriate value such that the absorbed molecules of the active gas are separated from each other on the surface of the seed layer 13. In doing so, the absorbed molecules become grown nuclei (or crystal embryos) of the granular crystals 14a of the second underlayer 21.

With presence of the grown nuclei, the granular crystals 14a start to grow essentially at the same time, hence the granular crystals 14a have substantially the same diameter. Further, the first underlayer 14 and the recording layer 15 accede the uniform grain diameter distribution of the granular crystals 14a, thereby, obtaining the recording layer 15 having uniform magnetic particle diameters.

In the treatment of absorption of the active gas onto the surface of the seed layer 13, for example, it is preferable that the surface of the seed layer 13 be exposed to the active gas within one unit of one Langmuir (L). Here, one L indicates exposure in active gas at a pressure of $1 \times 10^{-6}$ Torr.

The absorbed molecules may just be absorbed on the surface of the seed layer 13, or may further have functions of oxidizing or nitriding the surface of the seed layer 13 to convert the material of the seed layer 13. The absorbed molecules themselves function as crystal embryos, or the oxidized or nitrided surface by the absorbed molecules function as the crystal embryos.

In the perpendicular magnetic recording medium 20, the second underlayer 21 including the granular crystals 21a and granular crystal boundaries 21b is provided between the seed layer 13 and the first underlayer 14. Due to the second underlayer 21, crystal orientation of the granular crystals 14a of the first underlayer 14 is improved, and this further improves crystal orientation of the magnetic particles 15a of the recording layer 15. As a result, it is possible to reduce the total thickness of the first underlayer 14 and the second underlayer 21, and this makes the soft-magnetic underlayer 12 and the recording layer 15 close to each other. Consequently, it is possible to reduce the magnetic field of the magnetic head for recording, and reduce leakage of the magnetic field when recording.

In the perpendicular magnetic recording medium 20, thickness of the first underlayer 14 can be made less than that of the underlayer 14 in the first embodiment, and hence, it is possible to improve the properties of the surface of the first underlayer 14. Because the recording layer 15 and the protection layer 16 receive the influence of the surface properties of the first underlayer 14, it is possible to achieve a perpendicular magnetic recording medium having good surface properties. As a result, it is possible to reduce space loss between the magnetic head and the perpendicular magnetic recording medium 20, and increase the recording density.

Below, examples of the perpendicular magnetic recording media 10 and 20 are provided.

Example 1

This example shows a perpendicular magnetic recording medium having the same configuration as the perpendicular magnetic recording medium 10 of the first embodiment.

The perpendicular magnetic recording medium of this example includes, in order from the substrate side, a Si substrate, an amorphous silicon oxide film, a soft-magnetic underlayer, a seed layer, an underlayer, a 16 nm recording layer, and a protection film.

The soft-magnetic underlayer was formed from a CoZrNb film and was 20 nm in thickness. The seed layer was formed from a Ta film and was 3 nm in thickness. The underlayer was formed from a Ru film and was 13.2 nm in thickness. When forming the recording layer by sputtering, the sputtering target included 88.5% $Co_{67}Cr_7Pt_{26}$ in volume and 11.5% $SiO_2$ in volume. The protection film was formed from a carbon film and was 3 nm in thickness.

The CoZrNb film, the Ta film, and the carbon film were formed by using a DC magnetron in an atmosphere of Ar gas having a pressure of 0.399 Pa (or 3 mTorr). The Ru film was formed in an Ar gas atmosphere having a pressure of 5.32 Pa at a deposition speed of 0.55 nm/sec. The recording layer was formed by using a RF sputtering device in an Ar gas atmosphere having a pressure of 2.66 Pa. When forming the films, the Si substrate was not heated.

From cross-sectional views of the Ru film in the perpendicular magnetic recording medium of this example obtained by a TEM (Transmission Electron Microscope), it was observed that adjacent granular crystals were separated by interstices.

Example 2

This example shows a perpendicular magnetic recording medium having the same configuration as the perpendicular magnetic recording medium 20 of the second embodiment.

The perpendicular magnetic recording medium of this example includes, in order from the substrate side, a Si substrate, an amorphous silicon oxide film, a soft-magnetic underlayer, a seed layer, a second underlayer, a first underlayer, a recording layer, and a protection film.

The perpendicular magnetic recording medium of this example is the same as that of the first example, except that there are two underlayers: a second underlayer and a first underlayer stacked together.

The second underlayer was formed from a Ru film and was 6.6 nm in thickness. The fist underlayer was also formed from a Ru film and was also 6.6 nm in thickness.

When forming the Ru film of the second underlayer, the Ru film was formed in an Ar gas atmosphere having a pressure of 5.32 Pa at a deposition speed of 6.6 nm/sec. When forming the Ru film of the first underlayer, the Ru film was formed in an Ar gas atmosphere having a pressure of 5.32 Pa at a deposition speed of 0.55 nm/sec, which are the same as the conditions for forming the underlayer in the first example.

From cross-sectional views of the Ru film of the second underlayer and the Ru film of the first underlayer in the perpendicular magnetic recording medium of this example obtained by a TEM (Transmission Electron Microscope), it was observed that the Ru film of the second underlayer and the Ru film of the first underlayer form a continuing film, and in the Ru film of the first underlayer, adjacent granular crystals were separated by interstices.

Figure 5:
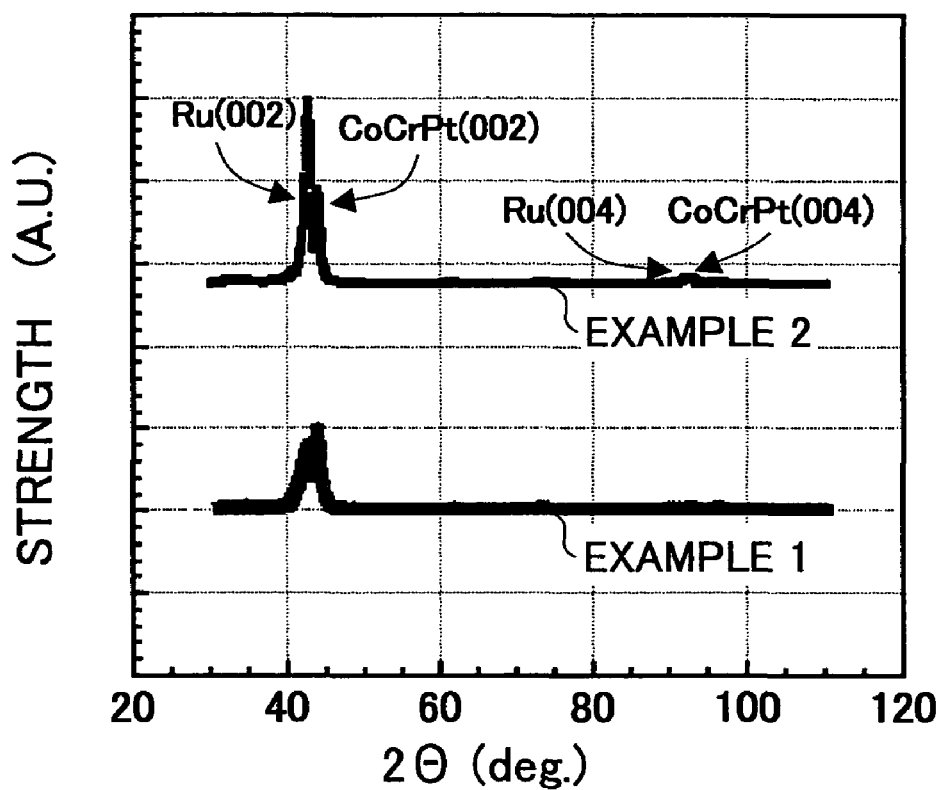
FIG. 5 shows crystal orientation of the Ru film of the underlayer and the CoCrPt magnetic particle of the recording layer described in example 1 and example 2.

FIG. 5 shows crystal orientation of the Ru film and the CoCrPt magnetic particle of the recording layer formed in example 1 and example 2.

The graphs in FIG. 5 indicate profiles of the perpendicular magnetic recording media described in example 1 and example 2, which were obtained by a X-ray diffraction spectrometer through θ-2θ scan.

As shown in FIG. 5, in both example 1 and example 2, diffraction peaks of the (002) plane and (004) plane of the Ru film, and the (002) plane and (004) plane of the CoCrPt magnetic particle were observed, but other diffraction peaks were not observed. This fact implies that the crystal orientations of the (001) plane of the Ru film, and the (001) plane of the CoCrPt magnetic particles of the recording layer are attained.

Figure 6A:
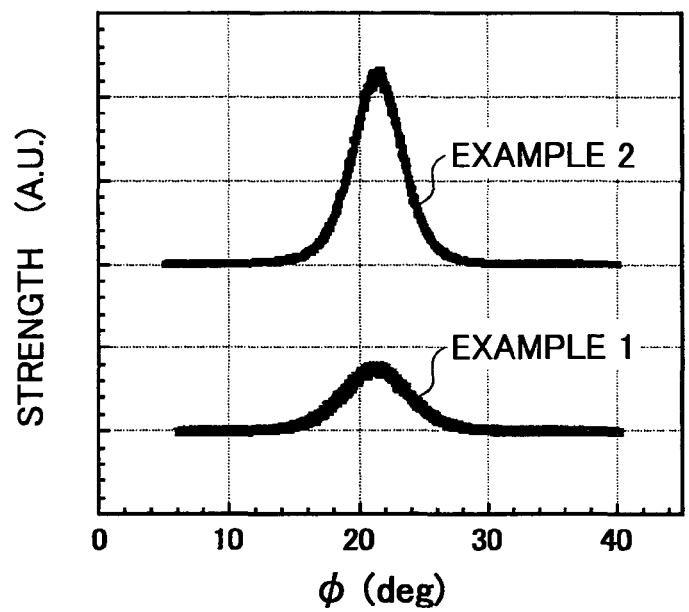
FIGS. 6A and 6B show crystal properties of the Ru film and the recording film in example 1 and example 2.
Figure 6B:
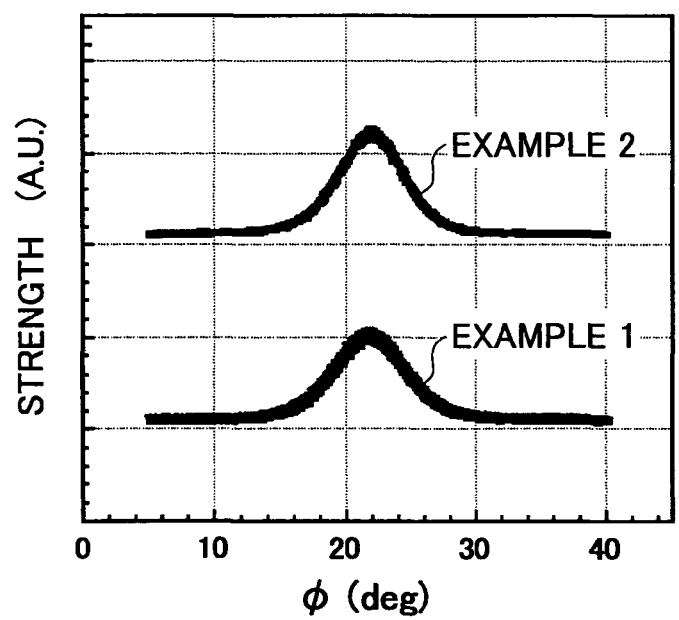

FIGS. 6A and 6B show crystal properties of the Ru film and the recording film in example 1 and example 2.

Shown in FIG. 6A are locking curves of the (002) plane of the Ru film, and in FIG. 6B, are locking curves of the (002) plane of the CoCrPt magnetic particles of the recording layer.

In FIG. 6A, from the locking curve of the (002) plane of the Ru film in example 1, a half-width value $\Delta\theta_{50}$ of 6.0 degrees was obtained, and from the locking curve of the (002) plane of the Ru film in example 2, a half-width value $\Delta\theta_{50}$ of 4.5 degrees was obtained. This implies that the (001) plane of the Ru film in example 2 is in a better condition of being parallel to the substrate than in example 1. In other words, the (001)

plane of the Ru film in example 2 has better properties of crystal orientation than in example 1.

In FIG. 6B, in example 1, the half-width value $\Delta\theta_{50}$ of the locking curve of the (002) plane of the CoCrPt magnetic particles of the recording layer was 6.3 degrees, and in example 2, the half-width value $\Delta\theta_{50}$ of the locking curve of the (002) plane of the CoCrPt magnetic particles was 5.6 degrees. This implies that the (001) plane of the CoCrPt magnetic particles in example 2 is in a better condition to be parallel to the substrate than in example 1. In other words, the easy axis of magnetization (c axis) of the CoCrPt magnetic particles in example 2 has better properties in a distribution of perpendicular anisotropy relative to the substrate than in example 1.

Figure 7:
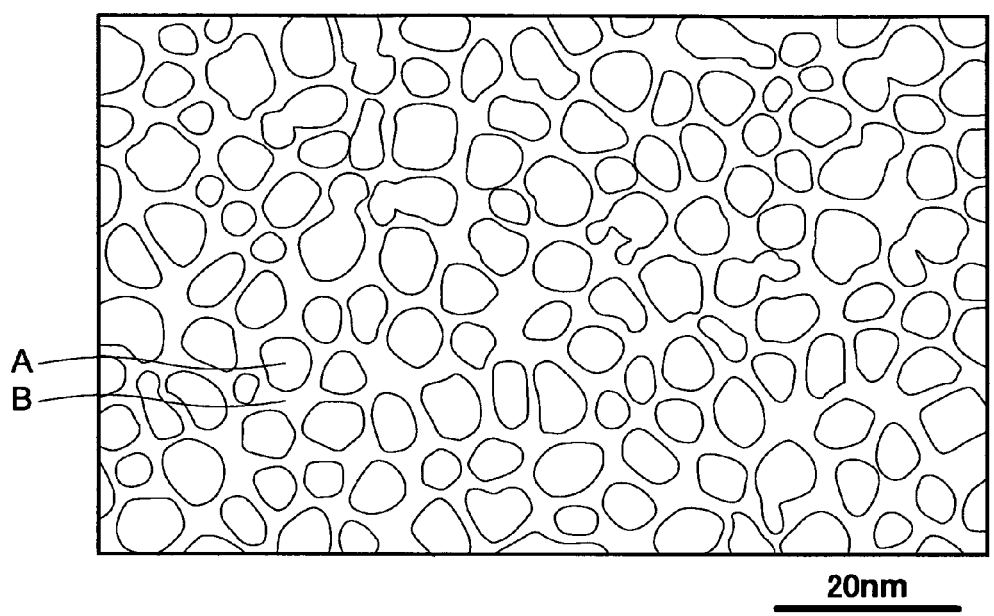
FIG. 7 is a schematic view of a planar TEM image of the recording layer of the perpendicular magnetic recording medium formed in example 2, illustrating the magnetic particles and the immiscible phases.

FIG. 7 is a sketched view of a planar TEM image of the recording layer of the perpendicular magnetic recording medium formed in example 2, illustrating the magnetic particles and the immiscible phases.

Figures 8, 9:
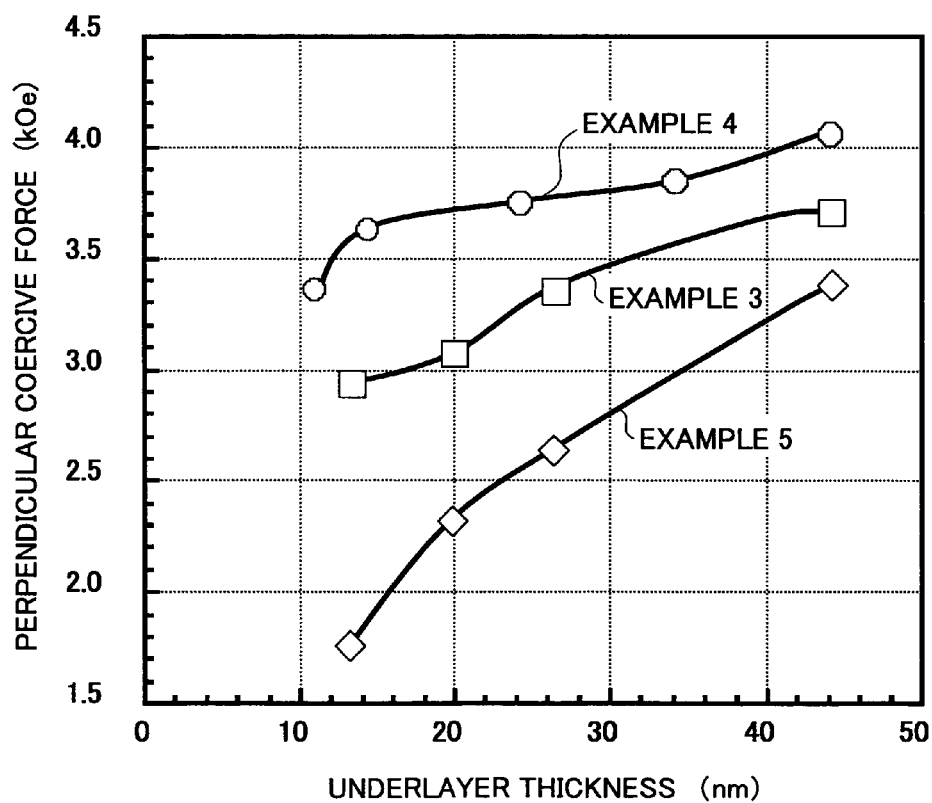
FIG. 8 is a table showing compositions of the magnetic particles and the immiscible phases illustrated in FIG. 7.
FIG. 9 graphs a relation between a perpendicular coercive force and thickness of the underlayer in perpendicular magnetic recording media described in examples 3, 4, and 5.

FIG. 8 is a table showing compositions of the magnetic particles and the immiscible phases illustrated in FIG. 7.

In FIG. 7, the planar TEM image is enlarged by 175 times. FIG. 8 shows the compositions, obtained by EDS (X-ray Energy Dispersion Spectroscopy) of the portions at point A and point B in FIG. 7.

With reference to FIG. 7 and FIG. 8, at the point A, the atomic content of Co was 64.3%, Pt 17.4%, and Cr 5.2%. Therefore, it is found that the portion at the point A is a magnetic particle, and the line around the point A illustrates the granular portion of the magnetic particle.

At the point B, the atomic content of Si was 45.1%, and O 39.6%, therefore, it is found that the portion at the point B is a zone of an immiscible phase.

From FIG. 7, it is also found that the average diameter of the magnetic particles is nearly 4 nm, and individual magnetic particles are separated from other magnetic particles by the immiscible phases and therefore an isolation state of the magnetic particles is attained. Furthermore, it is found that the magnetic particles are uniformly distributed, and this can be attributed to the uniform distribution of the granular crystals in the Ru film of the first underlayer.

Example 3

The perpendicular magnetic recording medium formed in this example was basically the same as that in example 1, except that the thickness of the Ru film of the underlayer was changed to be 13 nm, 20 nm, 26 nm, and 44 nm, the sputtering target was made of 90% $Co_{76}Cr_9Pt_{15}$ in volume and 10% $SiO_2$ in volume, and the soft-magnetic underlayer (that is, a CoZrNb film) was not formed to facilitate measurement of the coercive force.

Example 4

The perpendicular magnetic recording medium formed in this example was basically the same as that in example 2, except that the thickness of the Ru film of the second underlayer was fixed to be 6.6 nm, while the thickness of the Ru film of the first underlayer was changed so that the total thickness of the second underlayer and the first underlayer was 11 nm, 14 nm, 24 nm, 34 nm, and 44 nm, the sputtering target was made of 90% $Co_{76}Cr_9Pt_{15}$ in volume and 10% $SiO_2$ in volume, and the soft-magnetic underlayer (that is, a CoZrNb film) was not formed to facilitate measurement of the coercive force.

Example 5

This example is for comparison with the other examples.

The perpendicular magnetic recording medium formed in this example was basically the same as that in example 3, except that the deposition speed of the Ru film of the underlayer was fixed to be 6.6 nm/sec, while the thickness of the Ru film was changed to be 13 nm, 20 nm, 26 nm, and 44 nm.

By observing the TEM image of the cross section of the Ru film of the underlayer in the perpendicular magnetic recording medium of this example, it was found that the Ru film of the underlayer was a continuing film.

FIG. 9 shows a relation between a perpendicular coercive force and the thickness of the underlayer in perpendicular magnetic recording media described in examples 3, 4, 5.

The results of the perpendicular coercive force shown in FIG. 9 were measured by using a vibrating sample magnetometer to apply a perpendicular magnetic field on the substrate of a perpendicular magnetic recording medium.

The thickness of the underlayer was the thickness of the Ru film, or the total thickness of two Ru films in example 4.

As illustrated in FIG. 9, compared to example 5 in which the continuing Ru film was used as the underlayer, in example 3 and 4, regardless of the thickness of the underlayer, the perpendicular coercive force increased. Further, it was found that the examples 3 and 4 were particularly superior when the thickness of the underlayer was thin in the range from 10 nm to 20 nm.

As described above, in example 3, granular crystals of the Ru film are separated by interstices, and in example 4, below such a Ru film, a continuing Ru film was further provided. Comparing example 3 and example 4, it was found that the perpendicular coercive force in example 4 was greater than that in example 3. This implies that compared to example 5, the properties of crystal orientation obtained in example 3 are improved, and the properties of crystal orientation obtained in example 4 are further improved; moreover, the magnetic particles are distributed uniformly, and the spread of the distribution of the diameters of the magnetic particles is reduced.

Therefore, by adopting the configurations shown in example 3, moreover, in example 4, it is possible to reduce the total thickness of the second underlayer and the first underlayer, and this makes the soft-magnetic underlayer and the recording layer close to each other. Consequently, it is possible to reduce the magnetic field of the magnetic head for recording, and reduce leakage of the magnetic field when recording.

Third Embodiment

The perpendicular magnetic recording medium of the third embodiment is basically the same as the perpendicular magnetic recording medium of the second embodiment, except that a granular crystal embryo layer is further provided between the seed layer and the second underlayer in the third embodiment.

Figure 10:
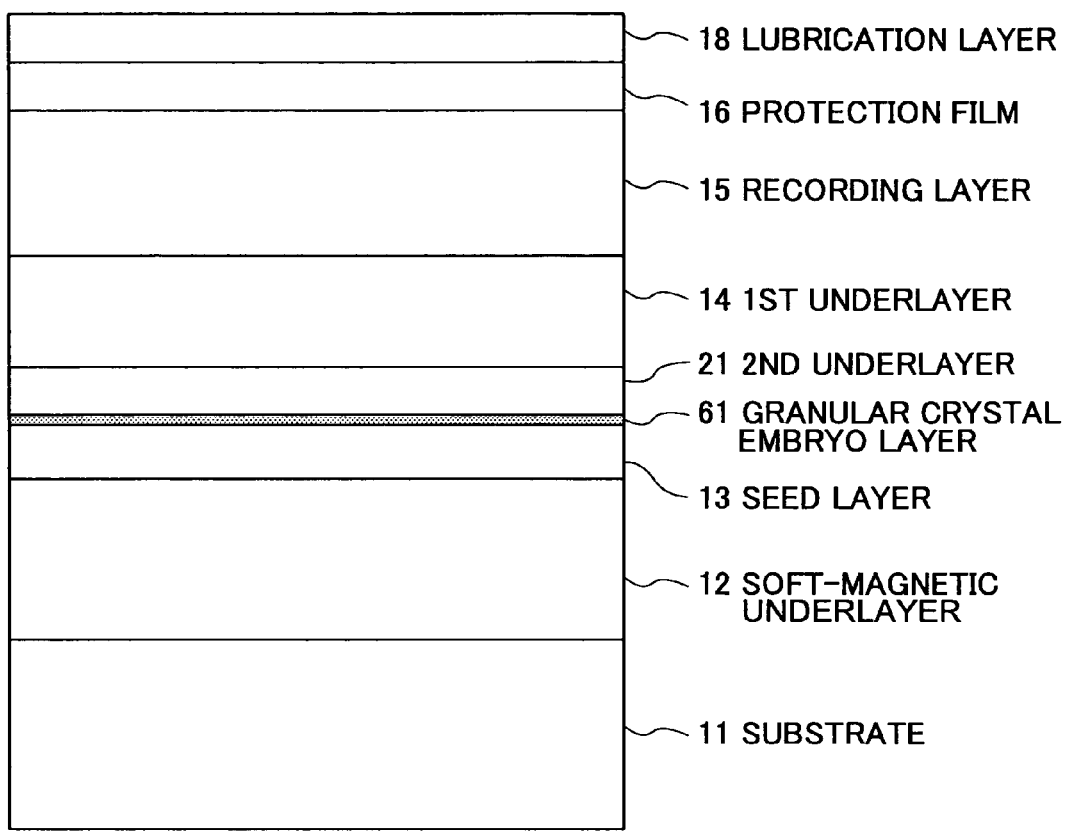
FIG. 10 is a schematic cross-sectional view of a perpendicular magnetic recording medium 60 according to a third embodiment of the present invention.

FIG. 10 is a schematic cross-sectional view of a perpendicular magnetic recording medium 60 according to the third embodiment of the present invention.

Figure 11:
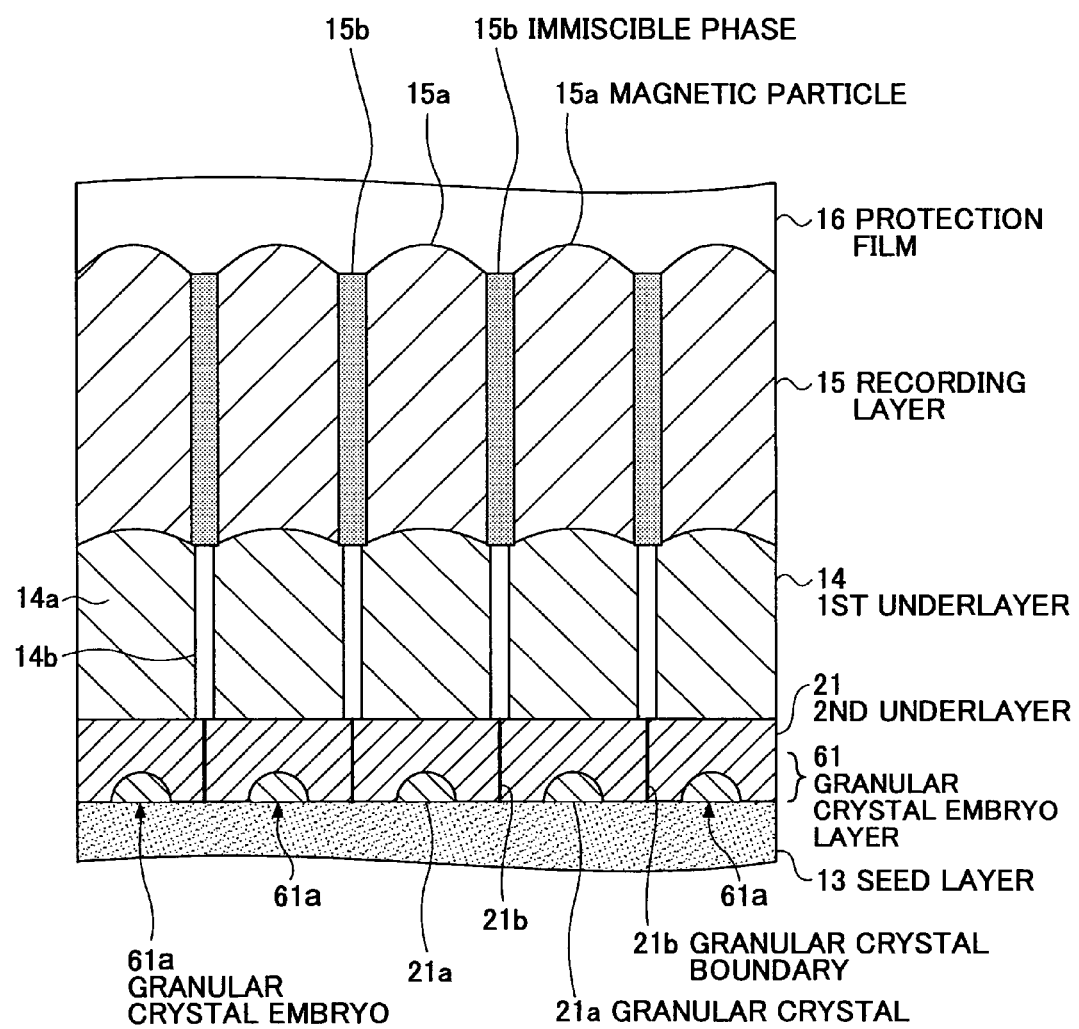
FIG. 11 is an enlarged schematic view of a portion of the perpendicular magnetic recording medium 60 of the third embodiment of the present invention.

FIG. 11 is an enlarged schematic view of a portion of the perpendicular magnetic recording medium 60.

In FIG. 10 and FIG. 11, the same reference numbers are used for the same elements as those in the previous embodiments, and overlapping descriptions are omitted.

As illustrated in FIG. 10 and FIG. 11, the perpendicular magnetic recording medium 60 includes a substrate 11, and a soft-magnetic underlayer 12, a seed layer 13, a granular crystal embryo layer 61, a second underlayer 21, a first underlayer 14, a recording layer 15, a protection film 16, and a lubrication layer 18 stacked on the substrate 11 in order.

In the perpendicular magnetic recording medium 60, a granular crystal embryo layer 61 is provided between the second underlayer 21 and the seed layer 13. The granular crystal embryo layer 61 includes plural isolate granular crystal embryos 61a on a surface of the seed layer. The granular crystal embryos 61a are separated from each other on the surface of the seed layer 13. Namely, the granular crystal embryo layer 61 is a non-continuous film including plural isolate granular crystal embryos 61a separated from each other.

The second granular crystals 21a of the second underlayer 21 grow with the granular crystal embryos 61a as starting nuclei and cover the granular crystal embryos 61a, thereby, forming the second underlayer 21.

The granular crystal embryo layer 61 may be formed from metallic materials, and there is no limitation to the components. From the view of easy formation of an isolate pattern, it is preferable to use metals having a high melting point. Such high melting point metals suitable for the granular crystal embryo layer 61 include Pt, W, Ag, Au, and alloys of them.

Alternatively, it is preferable that the granular crystal embryo layer 61 is formed from one or more of Ru, a Ru alloy, Ti, Ta, Co, and CoPt. Here, for example, the Ru alloy is a Ru—X alloy, where X represents one or more of Co, Cr, Fe, Ni, and Mn.

Due to usage of these materials, the atomic distance is small between the granular crystal embryos 61a and the second underlayer 21, and this makes it easy for the second underlayer 21 to grow on the surface of the granular crystal embryos 61a.

Further, it is preferable that the granular crystal embryo layer 61 be formed from Co or CoPt.

As for thickness of the granular crystal embryo layer 61, since the granular crystal embryo layer 61 is a non-continuous film, an equivalent thickness of the granular crystal embryo layer 61 is defined to be the thickness of a presumed continuous film having the same volume as an aggregation of the granular crystal embryos 61a in the granular crystal embryo layer 61. In this embodiment, preferably, the equivalent thickness of the granular crystal embryo layer 61 is set to be in a range from 0.2 nm to 1.0 nm.

Below, with reference to FIG. 10 and FIG. 11, an explanation is made of a method of fabricating the perpendicular magnetic recording medium 60 of the present embodiment.

The method of fabricating the perpendicular magnetic recording medium 60 is basically the same as that described in the second embodiment, except that an additional step of forming the granular crystal embryo layer 61.

Below, formation of the granular crystal embryo layer 61 is explained, and descriptions of other steps are omitted appropriately.

The granular crystal embryo layer 61 is formed on the surface of the seed layer 13 by sputtering a target made from any material for the granular crystal embryo layer 61 as described above.

For example, the granular crystal embryo layer 61 is formed in an atmosphere of Ar gas or other inactive gas by using a DC magnetron with the pressure of the Ar gas atmosphere set to be from 2.66 Pa to 26.6 Pa.

During this process, it is preferable that the deposition speed is low, for example, it is preferable that the deposition speed be set in a range from 0.1 nm/sec to 1 nm/sec. In calculations of the deposition speed, the aforesaid equivalent thickness of the granular crystal embryo layer 61 is used, which is the thickness of a presumed continuous film having the same volume as an aggregation of the granular crystal embryos 61a in the granular crystal embryo layer 61. As in other steps, the substrate 11 may be cooled.

The sputtering is stopped with the granular crystal embryos 61a being formed on the surface of the seed layer 13 while being separated from each other. Next, the second underlayer 21 is formed on the granular crystal embryo layer 61 in the way as described above.

According to the present embodiment, in the perpendicular magnetic recording medium 60, the granular crystal embryo layer 61 including plural isolate granular crystal embryos 61a on the surface of the seed layer 13 is provided between the second underlayer 21 and the seed layer 13, in which the granular crystal embryos 61a are separated from each other on the surface of the seed layer 13. The second granular crystals 21a of the second underlayer 21 grow with the granular crystal embryos 61a as starting nuclei and cover the granular crystal embryos 61a, thereby, forming the second underlayer 21.

With presence of the granular crystal embryos (grown nuclei), plural granular crystals 21a start to grow essentially at the same time, hence the granular crystals 21a have substantially the same diameter, resulting in uniform grain diameters of the granular crystals 21a of the second underlayer 21.

Further, since the granular crystals 14a of the first underlayer 14 grow on respective granular crystals 21a of the second underlayer 21, it is possible to obtain uniform grain diameters of the granular crystals 14a in the first underlayer 14.

Further, since the magnetic particles 15a of the recording layer 15 grow on respective granular crystals 14a of the first underlayer 14, it is possible to obtain more uniform diameters the magnetic particles 15a in the recording layer 15. The uniform diameters of the magnetic particles 15a in the recording layer 15 result in a good distribution of the magnetic particle diameters in the recording layer 15, In this way, since the perpendicular magnetic recording medium 60 has a good diameter distribution, the medium noise can be further reduced.

Certainly, the perpendicular magnetic recording medium 60 also have the effects of the perpendicular magnetic recording media described in the previous embodiments.

Fourth Embodiment

This embodiment relates to a magnetic storage device using the perpendicular magnetic recording media of the previous embodiments.

Figure 12:
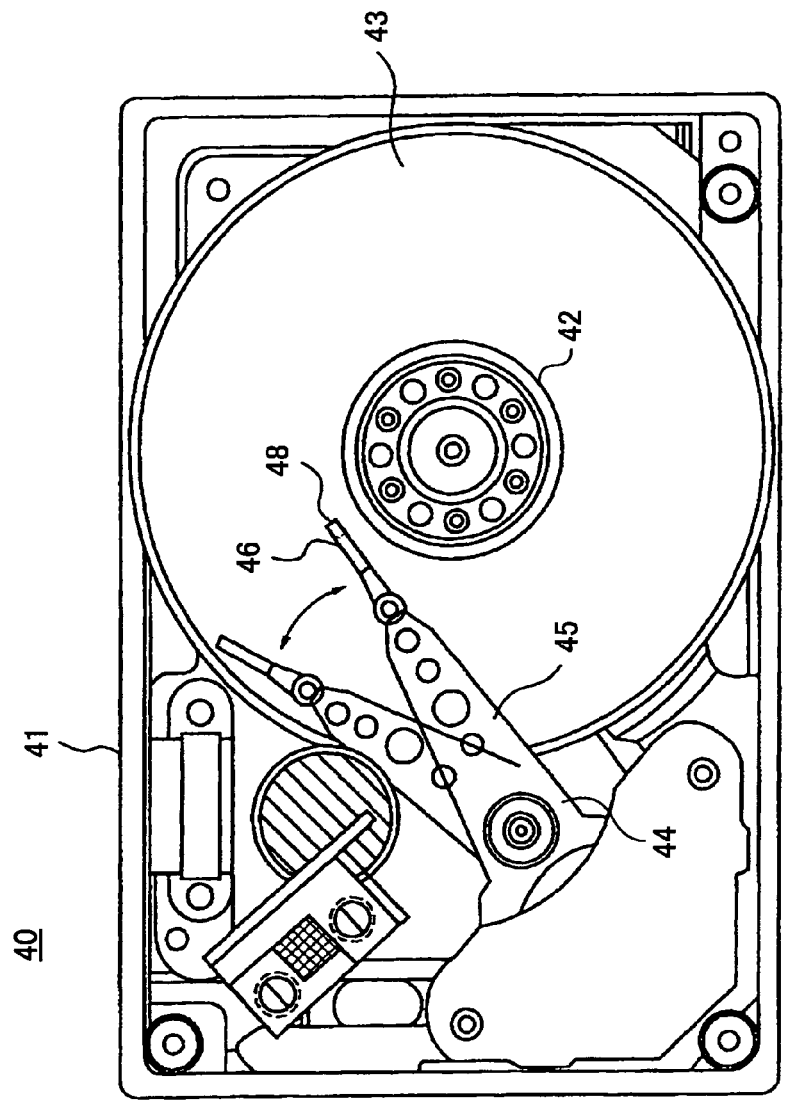
FIG. 12 is a schematic view of a principal portion of a magnetic storage device 40 according to a fourth embodiment of the present invention.

FIG. 12 is a schematic view of a principal portion of a magnetic storage device 40 according to a fourth embodiment of the present invention.

As illustrated in FIG. 12, the magnetic storage device 40 includes a housing 41, and in the housing 41, there are arranged a hub 42 driven by a not-illustrated spindle, a perpendicular magnetic recording medium 43 rotably fixed to the hub 42, an actuator unit 44, an arm 45 attached to the actuator unit 44 and movable in a radial direction of the perpendicular magnetic recording medium 43, a suspension 46, and a magnetic head 48 supported by the suspension 46.

Figure 13:
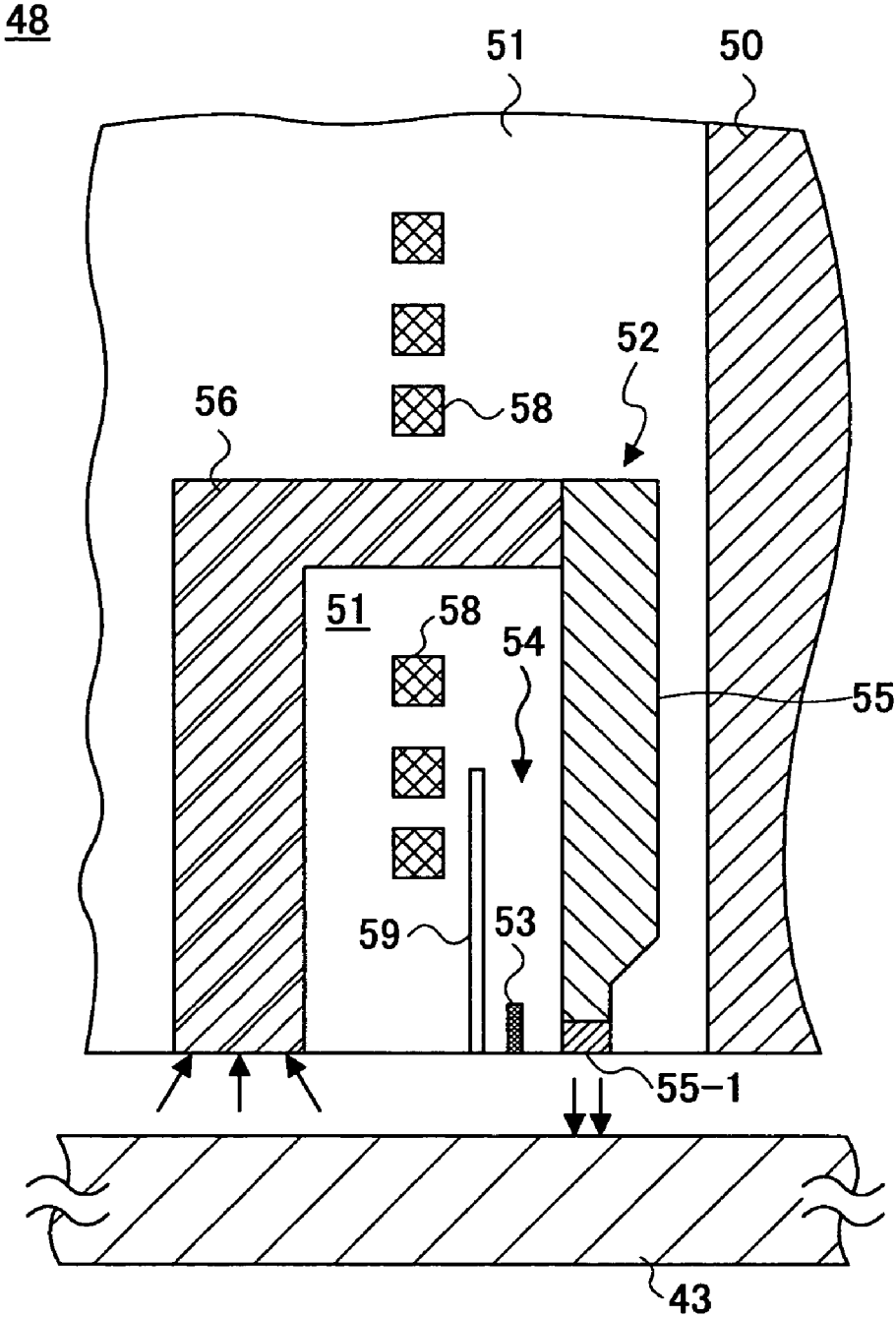
FIG. 13 is a schematic cross-sectional view of the magnetic head 48.

FIG. 13 is a schematic cross-sectional view of the magnetic head 48.

As illustrated in FIG. 13, the magnetic head 48 has a reproduction head 54, which has a single-pole recording head 52 and a GMR (Giant Magneto-Resistive) element 53 arranged on a slider 50 via an alumina insulating film 51. For example, the slider 50 is made from a ceramic like $Al_2O_3$—TiC.

The single-pole recording head 52 includes a main magnetic pole 55 formed from a soft magnetic material for applying a recording magnetic field on the perpendicular magnetic recording medium 43, a return yoke 56 magnetically connected to the main magnetic pole 55, and a recording coil 58 for guiding the recording magnetic field to the main magnetic pole 55 and the return yoke 56.

The main magnetic pole 55 acts as a lower shield of the reproduction head 54. In the reproduction head 54, the GMR element 53 is formed on the main magnetic pole 55 with the alumina insulating film 51 in between, and an upper shield 59 is formed on the main magnetic pole 55 with the alumina insulating film 51 in between.

The single-pole recording head 52 applies the recording magnetic field on the perpendicular magnetic recording medium 43 from the main magnetic pole 55 in the perpendicular direction, and magnetizes the perpendicular magnetic recording medium 43 in the perpendicular direction.

The end 55-1 of the main magnetic pole 55 gradually becomes thinner and thinner, that is, the cross section of the end 55-1 gradually becomes smaller and smaller. This makes the magnetic flux of the recording magnetic field high, and enables a high coercive force in the magnetized perpendicular magnetic recording medium 43.

Preferably, the end 55-1 of the main magnetic pole 55 is formed from soft magnetic materials having a high saturation magnetic flux density, for example, a material including 50% Ni and 50% Fe in number of atoms, or a FeCoNi alloy, or FeCoNiB, or FeCoAlO. Usage of these materials prevents magnetic saturation, and enables the high density magnetic flux to be concentrated and applied on the perpendicular magnetic recording medium 43.

The reproduction head 54 detects magnetic field leakage of magnetizations of the perpendicular magnetic recording medium 43, and obtains the data recorded on the perpendicular magnetic recording medium 43 according to variation of a resistance of the GMR element 53 corresponding to the direction of the detected magnetic field.

In the reproduction head 54, instead of the GMR element 53, a TMP (Ferromagnetic Tunnel Junction Magneto-Resistive) element can also be used.

In the magnetic storage device 40, the perpendicular magnetic recording media of the previous embodiments are used as the perpendicular magnetic recording medium 43.

In FIG. 12, although only one perpendicular magnetic recording medium 43 is illustrated, the present embodiment is not limited to this, and two or more perpendicular magnetic recording media 43 may be used, as long as one of them is the perpendicular magnetic recording media of the previous embodiments. It should be noted the configuration of the magnetic storage device 40 is not limited to that shown in FIG. 12 and FIG. 13, and the magnetic head 48 is not limited to the above configuration, either. Any well-known magnetic head can be used. Further, the perpendicular magnetic recording medium 43 is not limited to magnetic disks; it may also be magnetic tapes.

According to the present embodiment, it is possible to reduce noise in the perpendicular magnetic recording medium 43 in the magnetic storage device 40, and because the soft-magnetic underlayer and the recording layer can be arranged close to each other, it is possible to reduce leakage of the magnetic field of the magnetic head when recording. Consequently, it is possible to increase a linear recording density and a track density, and realize high density recording.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

According to the present invention, in a perpendicular magnetic recording medium including a recording layer having a columnar granular structure, because granular crystals in an underlayer formed from Ru or Ru alloys are separated from each other, it is possible to obtain an appropriate diameter distribution and uniform arrangement of magnetic particles in the perpendicular magnetic recording medium.

What is claimed is:

1. A perpendicular magnetic recording medium, comprising:
    a substrate;
    a soft-magnetic underlayer on the substrate;
    a seed layer formed from an amorphous material on the soft-magnetic underlayer;
    an underlayer formed from Ru on the seed layer, the underlayer including a plurality of granular crystals each growing in a direction perpendicular to a surface of the substrate, and a plurality of empty interstices separating the granular crystals from each other;
    a recording layer on the underlayer, the recording layer including a plurality of magnetic particles each having an easy axis of magnetization substantially perpendicular to the surface of the substrate, and a plurality of non-magnetic immiscible phases separating the magnetic particles from each other;
    a second underlayer between the seed layer and the underlayer; and
    a grain embryo layer including a plurality of isolate grain embryos directly on a surface of the seed layer,
    wherein the second underlayer includes a plurality of second granular crystals formed from Ru and a plurality of polycrystalline films, each of the polycrystalline films being formed by the second granular crystals coupled with each other through granular boundaries,
    wherein the second underlayer is formed so that the second granular crystals cover the grain embryos,
    wherein intervals between the granular crystals in the underlayer are in a range from 1 nm to 2 nm, and
    wherein the grain embryo layer is formed from a material including at least one of Pt, W, Ag, Au, and alloys of Pt, W, Ag, Au.

2. The perpendicular magnetic recording medium as claimed in claim 1, wherein the plurality of empty interstices are formed from a bottom of the underlayer to an interface between the underlayer and the recording layer.

3. The perpendicular magnetic recording medium as claimed in claim 1, wherein an average diameter of the granular crystals in the underlayer is in a range from 2 nm to 10 nm.

4. The perpendicular magnetic recording medium as claimed in claim 1, wherein the grain embryo layer is formed from a material including at least one of Ru, a Ru alloy, Ti, Ta, Co, and CoPt.

5. The perpendicular magnetic recording medium as claimed in claim 4, wherein the Ru alloy is a Ru—X alloy, where X represents at least one of Co, Cr, Fe, Ni, and Mn.

6. The perpendicular magnetic recording medium as claimed in claim 1, wherein an equivalent thickness of the grain embryo layer is set to be in a range from 0.2 nm to 1.0 nm, the equivalent thickness of the grain embryo layer being determined by assuming that the grain embryo layer is a continuous film having the same volume as an aggregation of the grain embryos.

7. The perpendicular magnetic recording medium as claimed in claim 1, wherein the seed layer is formed from a material including at least one of Ta, Ti, C, Mo, W, Re, Os, Hf, Mg, Pt, and alloys of Ta, Ti, C, Mo, W, Re, Os, Hf, Mg, and Pt, or NiP.

8. The perpendicular magnetic recording medium as claimed in claim 1, wherein the seed layer is a single layer, and a thickness of the seed layer is from 1 nm to 10 nm.

9. The perpendicular magnetic recording medium as claimed in claim 1, wherein
the magnetic particles in the recording layer are formed from one of Ni, Fe, Co, Ni-based alloys, Fe-based alloys, and Co-based alloys selected from CoCrTa, CoCrPt, and CoCrPt-M, where M represents a material including at least one of B, Mo, Nb, Ta, W, Cu, and alloys thereof.

10. The perpendicular magnetic recording medium as claimed in claim 1, wherein
the immiscible phases in the recording layer are formed from a compound including at least one of Si, Al, Ta, Zr, Y, and Mg, and at least one of O, C, and N.

11. A magnetic storage device, comprising:
a recording and reproduction unit including a magnetic head; and
a perpendicular magnetic recording medium,
wherein
the perpendicular magnetic recording medium includes
a substrate;
a soft-magnetic underlayer on the substrate;
a seed layer formed from an amorphous material on the soft-magnetic underlayer;
an underlayer formed from Ru on the seed layer, the underlayer including a plurality of granular crystals each growing in a direction perpendicular to a surface of the substrate, and a plurality of empty interstices separating the granular crystals from each other;
a recording layer on the underlayer, the recording layer including a plurality of magnetic particles each having an easy axis of magnetization substantially perpendicular to the surface of the substrate, and a plurality of non-magnetic immiscible phases separating the magnetic particles from each other;
a second underlayer between the seed layer and the underlayer; and
a grain embryo layer including a plurality of isolate grain embryos directly on a surface of the seed layer,
wherein the second underlayer includes a plurality of second granular crystals formed from Ru and a plurality of polycrystalline films, each of the polycrystalline films being formed by the second granular crystals coupled with each other through granular boundaries,
wherein the second underlayer is formed so that the second granular crystals cover the grain embryos,
wherein intervals between the granular crystals in the underlayer are in a range from 1 nm to 2 nm, and
wherein the grain embryo layer is formed from a material including at least one of Pt, W, Ag, Au, and alloys of Pt, W, AR, Au.

12. The perpendicular magnetic recording medium as claimed in claim 1, wherein a material forming the grain embryo layer is different from a material forming the second underlayer.

13. The perpendicular magnetic recording medium as claimed in claim 11, wherein a material forming the grain embryo layer is different from a material forming the second underlayer.

* * * * *